United States Patent [19]

Suzuki et al.

[11] Patent Number: 4,643,746

[45] Date of Patent: Feb. 17, 1987

[54] APPARATUS FOR SEPARATING GAS FROM FLUID

[75] Inventors: Ryushi Suzuki; Joji Yamaga, both of Tokyo, Japan

[73] Assignee: Ishikawajima-Harima Jukogyo Kabushiki Kaisha, Tokyo, Japan

[21] Appl. No.: 773,115

[22] Filed: Sep. 6, 1985

[30] Foreign Application Priority Data

Sep. 11, 1984 [JP] Japan .......................... 59-137337[U]

[51] Int. Cl.⁴ .............................................. B01D 19/00
[52] U.S. Cl. ............................................ 55/204; 55/52
[58] Field of Search ................... 55/55, 159, 182, 189, 55/191, 194, 204, 52

[56] References Cited

U.S. PATENT DOCUMENTS

| Re. 27,882 | 1/1974 | Burnham | 55/55 |
| 2,200,620 | 5/1940 | Findley | 55/191 |
| 2,231,501 | 2/1941 | Jepertinger | 55/191 X |
| 3,163,508 | 12/1964 | Tuck et al. | 55/52 |
| 3,670,850 | 6/1972 | Swearingen | 55/182 X |
| 3,776,385 | 12/1973 | Maciula | 55/52 X |
| 3,778,969 | 12/1973 | Sudduth | 55/55 |
| 4,201,555 | 5/1980 | Tkach | 55/52 X |
| 4,322,226 | 3/1982 | Hudec | 55/55 X |
| 4,369,047 | 1/1983 | Arscott et al. | 55/52 X |

Primary Examiner—Charles Hart

[57] ABSTRACT

In order to prevent bubbles collected by a bubble collecting device from flowing again into a fluid, the bubbles are positively discharged from a bubble collecting zone and directed to an upper portion in a liquid container so that even when the fluid is discharged together with the bubbles, such discharged fluid is positively recovered in the fluid vessel.

7 Claims, 3 Drawing Figures

APPARATUS FOR SEPARATING GAS FROM FLUID

BACKGROUND OF THE INVENTION

The present invention relates to an apparatus for effectively separating gases from a fluid.

The gases entrained in a fluid must be separating because they cause damages to apparatus and devices, increase in compressivity, errosion due to cavitation, vibrations, noise, poor quality products, changes in property of the fluid, degradation of the fluid and so on.

In order to separate the gases from the fluid, there has been devised and demonstrated a system in which bubbles in the fluid are collected. That is, the fluid is introduced into a cylindrical or coil-shaped passage to swirl and the bubbles are collected at the center of the vortexes by utilizing the centrifugal force, thereby separating the bubbles from the fluid.

FIGS. 1 and 2 show a conventional system. The lower end of a cylinder 1 which is a container defining a cylindrical space therein is closed with a cover 2 and an inlet pipe 5 is so disposed that the fluid is pumped by a pump 3 and is introduced into the cylinder 1 in the tangential direction. The upper end of the cylinder 1 is closed with a cover 6 and an outlet pipe 9 is so disposed that one end thereof is connected to an outlet 7 while the other end thereof is connected to a fluid vessel 8, whereby a bubble collecting apparatus 10 is provided.

In the apparatus of the type described above, the fluid entraining the bubbles is caused to flow into the cylinder with a predetermined velocity so that the bubbles entrained in the fluid are collected in the form of a gas column a because of the swirling flow produced in the cylinder 1, the shape of the gas column a being depending upon the flow rate and viscosity of the fluid. Part of the gas thus collected is separated in the form of a large diameter bubble b from the upper end of the gas column a and flows downstream together with the fluid into the fluid vessel 8 where the large-diameter bubbles floats up and are discharged into the surrounding atmosphere.

However, in the conventional system of the type described, when the large-diameter bubble b flows through the outlet pipe 9 into the fluid vessel 8, it collides against the walls of the outlet pipe 9 and fluid vessel 8 so that it is divided into fine bubbles again. In addition, there arises the problem that prior to floating to the fluid surface in the vessel 8, the large-sized bubble b is caused to flow into the suction port of a pump so that it flows through a system line.

In view of the above, the primary object of the present invention is to considerably improve the effect of separating the bubbles entrained in the fluid by causing the bubbles to be collected by the swirling flow and positively discharged into the surrounding atmosphere.

The above and other objects, effects, features and advantages of the present invention will become more apparent from the following description of a preferred embodiment thereof taken in conjunction with the accompanying drawings.

DETAILED DESCRIPTION OF THE EMBODIMENT

Figure 1:
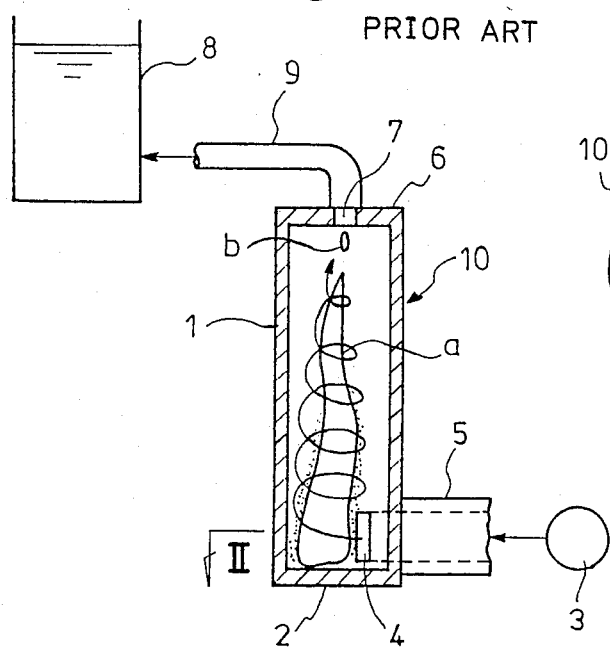
FIG. 1 is a schematic view of a conventional apparatus for separating gas from fluid.
Figure 2:
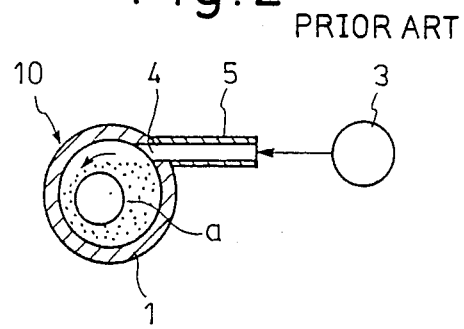
FIG. 2 is a view looking in the direction of arrow II of FIG. 1.
Figure 3:
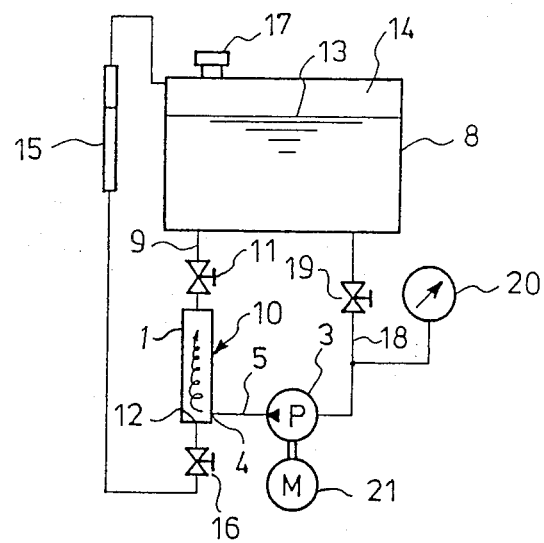
FIG. 3 is a schematic view of a preferred embodiment of the present invention.

FIG. 3 shows one embodiment of the present invention in which the bubble collecting device as shown in FIGS. 1 and 2 is utilized. The upper end of the outlet pipe 9 of the bubble collecting device 10 is connected to the fluid vessel 8 at a position below a fluid level 13 in the vessel 8 through restriction means 11 such as a regulating valve or an orifice. A gas outlet 12 is defined on the axial center at an end of the cylinder 1 adjacent to the opening of the inlet pipe 5 and one end of a gas discharge pipe 15 is connected to the gas outlet 12 while the other end thereof is communicated with an upper portion of the vessel 8 such as a space 14 defined in the fluid vessel 8 above the fluid level 13 or the portion a little bit below the fluid level 13. In this embodiment, part of the gas discharge pipe 15 is shown as being enlarged in diameter, but it is to be understood that the gas discharge pipe 15 may have the same cross sectional area through its full length. Reference numeral 16 designates a valve inserted into the discharge pipe 15; and 17, a gas discharge port of the fluid vessel 8.

In order to introduce the liquid into the cylinder 1, the pump 3 is communicated with the bottom of the fluid vessel 8 through a pipe 18, whereby a circulation passage is defined. Restriction means 19 such as a regulating valve or an orifice is inserted into the pipe 18. Reference numeral 20 designates a pressure gage interposed between the pump 3 and the restriction means 19 in the pipe 18; and 21, a motor.

When the liquid is charged at a predetermined flow rate from the pump 3 into the cylinder 1 in the tangential direction thereof, it forms a swirling flow. As a result, the pressures along the axis of the cylinder 1 drop so that the bubbles are collected along the axis thereof. The pressure along the axis of the cylinder 1 is lowest at the vicinity of the inlet 4 and is gradually increased as the fluid flows downstream. The pressure reaches a maximum peak and then drops so that the bubbles are collected around the axis of the cylinder 1 in the vicinity of the inlet 4, thereby forming the gas column a shown in FIG. 1. In some cases, depending upon the flow rate and the inner diameter of the cylinder 1, the pressure at the axis of the cylinder 1 in the vicinity of the inlet 4 becomes lower than the atmospheric pressure. In such a case, the restriction means 11 is so operated that the pressure around the axis of the cylinder 1 in the vicinity of the inlet 4 becomes slightly higher than the atmospheric pressure plus the fluid head pressure.

Therefore, when the valve 16 is opened, the collected bubbles can be discharged into the space 14 in the fluid vessel 8 through the gas discharge pipe 15. Since the bubbles which are collected by the bubble collecting device 10 are separated and completely discharged, the positive separation of the gas from the fluid can be ensured.

In some cases, the fluid may flow into the gas discharge pipe 15 due to some reasons. Even in that event, because the upper end of the gas discharge pipe 15 is communicated with the space 14 in the fluid vessel 8 above the fluid level 13 or with the portion a little bit below the fluid level 13, the fluid is positively recovered in the fluid vessel 8. Thus the fluid is prevented from flowing out of the system.

The restriction means 19 is interposed in the pipe line 18 intercommunicating between the pump 3 and the fluid vessel 8 so that the pressure of the fluid sucked by the pump 3 can be made lower than the atmospheric pressure. As a result, the gas which has been dissolved in the fluid is discharged out of the fluid and small bubbles are enlarged in diameter (because of their growth and coalescence). Therefore, the bubbles can be effectively collected in the bubble collecting device 10.

When the liquid whose entrained gas is separated and whose dissolved gas is removed in the manner described above is sealed into a closed container such as a shock absorber, a cylinder, an accumulator or the like and is subjected to vibration, the gas remaining in the closed container is dispersed and dissolved so that it is not needed to remove the residual gas (this step is called "air discharge" in the case of the air). Therefore, the defect that the compressivity of the fluid is increased due to the presence of the residual gas can be eliminated.

The present invention is not limited to the preferred embodiment just described above and it is understood that various modifications can be effected without departing the true spirit of the present invention. The restriction means 11 such as a regulating valve or an orifice is provided so that the fluid flowing from the bubble collecting device 10 to the fluid vessel 8 has a back pressure, whereby the bubbles collected in the bubble collecting device 10 are discharged through the gas outlet 12. Instead of such restriction means 11, a pipe whose inner diameter is small may be used to cause the pressure loss. In addition, so far the space 14 of the fluid vessel 8 has been described as being communicated through the discharge port 17 with the surrounding atmosphere, but it is understood that the present invention may be equally applied even when the fluid vessel 8 is closed so that the space 14 above the fluid surface 13 is maintained at a pressure higher than or lower than the atmospheric pressure. Furthermore, the present invention is not limited to the posture of the bubble collecting device. Moreover, the gas discharge pipe 15 may be connected to the vessel 8 at a level slightly lower than the fluid surface 13.

As described above, according to the apparatus for separating the gases from the fluid, the restriction means is interposed between the outlet of the bubble collecting device and the fluid vessel so that the pressure around the axis of the cylinder in the vicinity of the inlet can be maintained at a predetermined level and the bubbles are discharged from the axial portion of the fluid inlet to the bubble collecting device into the gas discharge pipe. In other words, the collected bubbles are not directed downstream, but are forced to flow into the gas discharge pipe. As a result, the gas separation efficiency can be remarkably improved. Furthermore, according to the present invention, the upper end of the gas discharge pipe is communicated with the upper portion of the fluid vessel so that even when the fluid should flow into the gas discharge pipe due to some reasons, the fluid can be positively recovered in the fluid vessel. As a result, the loss of the fluid is prevented and the environmental pollution can be safely avoided.

What is claimed is:

1. An apparatus for removing gases from a fluid comprising a bubble collecting device in the form of a cylinder having a cylindrical space therein, an inflow port at one end of said device disposed so that fluid is received therethrough and tangentially in said space to cause the fluid to form a swirling flow in the cylindrical space in such pressure distribution that pressure along the axis of the cylinder is lowest in the vicinity of the inflow port and rises gradually toward the downstream side to become a maximum and then decreases, thereby collecting the bubbles in a zone at the cylinder axis in the vicinity of the inflow port, a fluid discharge port on an axis of said bubble collecting device at the other end thereof, a fluid container having a fluid level therein, a first restriction means through which said fluid discharge port is communicated with a portion below the fluid level of said fluid container, a gas discharge port on the axis of said bubble collecting device at said one end thereof for removing collected bubbles from said bubble collecting zone irrespective of buoyancy, and a gas discharge pipe having one end communicated with said gas discharge port and the other end connected to an upper portion above the fluid level in the fluid container for discharging the collected bubbles through the discharge port by a back pressure provided by said first restriction means overcoming a negative pressure of the bubble collecting zone.

2. An apparatus according to claim 1 wherein said first restriction means comprises a regulating valve.

3. An apparatus according to claim 1 wherein said first restriction means comprises an orifice.

4. An apparatus according to claim 1 wherein said first restriction means comprises a resistance received by the flowing fluid.

5. An apparatus according to claim 1 wherein a pump for supplying the fluid into said bubble collecting device is connected by a pipe to a bottom of said bubble collecting device through second restriction means.

6. An apparatus according to claim 5 wherein said second restriction means comprises a regulating valve.

7. An apparatus according to claim 5 wherein said second restriction means comprises an orifice.

* * * * *